(12) United States Patent
Kahn et al.

(10) Patent No.: US 7,509,002 B2
(45) Date of Patent: Mar. 24, 2009

(54) ADAPTIVE OPTICAL SIGNAL PROCESSING WITH MULTIMODE WAVEGUIDES

(75) Inventors: Joseph M. Kahn, San Carlos, CA (US); Mark A. Horowitz, Menlo Park, CA (US); Olav Solgaard, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/940,199

(22) Filed: Nov. 14, 2007

(65) Prior Publication Data

US 2008/0069561 A1 Mar. 20, 2008

Related U.S. Application Data

(63) Continuation of application No. 10/915,118, filed on Aug. 10, 2004, now Pat. No. 7,327,914.

(51) Int. Cl.
*G02B 6/26* (2006.01)

(52) U.S. Cl. .......................................... 385/15; 385/39

(58) Field of Classification Search ................... 385/15, 385/39
See application file for complete search history.

(56) References Cited

U.S. PATENT DOCUMENTS

| 4,847,797 | A | 7/1989 | Picchi et al. | |
|---|---|---|---|---|
| 4,859,012 | A | 8/1989 | Cohn | |
| 5,127,068 | A | 6/1992 | Baer et al. | |
| 5,362,961 | A | 11/1994 | Hamanaka | |
| 5,428,218 | A | 6/1995 | Toughlian et al. | |
| 5,436,759 | A | 7/1995 | Dijaili et al. | |
| 5,963,349 | A | 10/1999 | Norte | |
| 6,912,091 | B2 | 6/2005 | Hamanaka et al. | |
| 6,970,252 | B2 | 11/2005 | Knuttel | |
| 7,039,267 | B2 | 5/2006 | Ducellier et al. | |
| 7,076,168 | B1 * | 7/2006 | Shattil | 398/76 |
| 7,194,155 | B1 * | 3/2007 | Kahn et al. | 385/27 |
| 2002/0126479 | A1 | 9/2002 | Zhai | |
| 2003/0010889 | A1 | 1/2003 | Igasaki et al. | |
| 2003/0156774 | A1 | 8/2003 | Conradi | |
| 2003/0214571 | A1 * | 11/2003 | Ishikawa et al. | 347/255 |
| 2004/0012835 | A1 * | 1/2004 | Ohbayashi et al. | 359/237 |
| 2004/0096143 | A1 | 5/2004 | Shpantzer et al. | |
| 2005/0078643 | A1 * | 4/2005 | Archiable | 370/338 |
| 2006/0034352 | A1 * | 2/2006 | Sampath et al. | 375/148 |
| 2006/0274844 | A1 * | 12/2006 | Walton et al. | 375/260 |

OTHER PUBLICATIONS

H.R. Stuart, "Dispersive Multiplexing in Multimode Optical Fiber", *Science*, vol. 289, pp. 281-283, Jul. 14, 2000.

(Continued)

*Primary Examiner*—Ellen Kim
(74) *Attorney, Agent, or Firm*—Crawford Maunu PLLC (57) ABSTRACT

Optical signals are passed in an optical medium using an approach that facilitates the mitigation of interference. According to an example embodiment, a filtering-type approach is used with an optical signal conveyed in an optical fiber, such as a multimode fiber (MMF) or a multimode waveguide. Adaptive spatial domain signal processing, responsive to a feedback signal indicative of data conveyed in the multimode waveguide, is used to mitigate interference in optical signals conveyed in the multimode waveguide.

2 Claims, 9 Drawing Sheets

OTHER PUBLICATIONS

P. Pepeljugoski, D. Kuchta, Y. Kwark, P. Pleunis and G. Kuyt, "15.6 Gb/s Transmission Over 1 km of Next Generation Multimode Fiber", *IEEE Photon. Technol. Lett.*, vol. 14, No. 5, pp. 717-719, May 2002.

L.B. Aronson, B.E. Lemoff, L.A. Buckman and D.W. Dolfi, "Low-Cost Multimode WDM for Local Area Networks Up to 10 Gb/s", *IEEE Photon. Technol. Lett.*, vol. 10, No. 10, pp. 1489-1491, Oct. 1998.

L. Raddatz, I.H. White, D.G. Cunningham and M.C. Nowell, "Influence of Restricted Mode Excitation on Bandwidth of Multimode Fiber Links", *IEEE Photon. Technol. Lett.*, vol. 10, No. 4, pp. 534-536, Apr. 1998.

L. Raddatz, I.H. White, D.G. Cunningham and M.C. Nowell, "An Experimental and Theoretical Study of the Offset Launch Technique for the Enhancement of the Bandwidth of Multimode Fiber Links", *IEEE J. of Lightwave Technol.*, vol. 16, No. 3, pp. 324-331, Mar. 1998.

X. Zhao and F.S. Choa, "Demonstration of 10 Gb/s Transmission Over a 1.5 km Long Multimode Fiber Using Equalization Techniques", *IEEE Photon. Technol. Lett.*, vol. 14, No. 8, pp. 1197-1189, Aug. 2002.

L. Raddatz and I. H. White, "Overcoming the Modal Bandwidth Limitation of Multimode Fiber by Using Passband Modulation", *IEEE Photon. Technol. Lett.*, vol. 11, No. 2, pp. 266-268, Feb. 1999.

T.K. Woodward, S. Hunsche, A.J. Ritger and J.B. Stark, "1 Gb/s BPSK Transmission at 850 nm Over 1 km of 62.5 □m Core Multimode Fiber Using a Single 2.5 GHz Subcarrier", *IEEE Photon. Technol. Lett.*, vol. 11, No. 3, pp. 382-384, Mar. 1999.

E. J. Tyler, M. Webster, R. V. Penty and I. H. White, "Penalty-Free Subcarrier-Modulated Multimode Fiber Links for Datacomm Applications Beyond the Bandwidth Limit", *IEEE Photon. Technol. Lett.*, vol. 14, No. 1, pp. 110-112, Jan. 2002.

K.M. Patel and S.E. Ralph, "Enhanced Multimode Fiber Link Performance Using a Spatially Resolved Receiver", *IEEE Photon. Technol. Lett.*, vol. 14, No. 3, pp. 393-395, Mar. 2002.

C. Argon, K. M. Patel, S. W. McLaughlin and S. E. Ralph, "Exploiting Diversity in Multimode Fiber Communications Links via Multisegment Detectors and Equalization", *IEEE Commun. Lett.*, vol. 7, No. 8, pp. 400-402, Aug. 2003.

F. Dubois, Ph. Emplit and O. Hugon, "Selective Mode Excitation in Graded-Index Multimode Fiber by a Computer-Generated Optical Mask", *Optics Lett.*, vol. 19, No. 7, pp. 433-435, Apr. 1994.

M. Duparre, V. Pavelyev, B. Luedge, B. Kley, V. Soifer and R. Kowarschik, "Generation, Superposition and Separation of Gauss-Hermite Modes by Means of DOEs", *Proc. of SPIE*, vol. 3291, pp. 104-114, 1998.

U. Levy, H. Kobrinsky and A.A. Friesem, "Angular Multiplexing for Multichannel Communication in a Single Fiber", IEEE *J. of Quantum Electron.*, vol. QE-17, No. 11, pp. 2215-2224, Nov. 1981.

K. H. Brenner, U. W. Krackhardt and R. Klug, "Directional Multiplexing for Optical Board-to-Board Interconnections", *Proc. of SPIE*, vol. 3490, pp. 416-418, 1998.

\* cited by examiner

ADAPTIVE OPTICAL SIGNAL PROCESSING WITH MULTIMODE WAVEGUIDES

RELATED PATENT DOCUMENTS

This application is a continuation of U.S. patent application Ser. No. 10/915,118 filed on Aug. 10, 2004 and issued as U.S. Pat. No. 7,327,914, to which priority is claimed under 35 U.S.C. § 120, and which is hereby fully incorporated by reference.

FIELD OF THE INVENTION

The present invention relates generally to optical systems, and more particularly to adaptive signal processing with multimode optical fibers.

BACKGROUND

Multimode optical fiber is a ubiquitous medium that is installed in a variety of applications, such as with universities, schools, hospitals, businesses and factories. In local and campus area networks, multimode fiber (MMF) has often been favored over single-mode fiber (SMF) because of the low cost of fiber installation and maintenance, and because of the much lower cost of transceiver components for MMF. In this context, "mode" generally refers to the characteristic of the propagation of light (e.g., through a waveguide) that can be designated by a radiation pattern in a plane transverse to the direction of travel. "Single-mode fiber (SMF)" thus has been used to generally refer to a fiber that facilitates light propagation that is designated by a single light characteristic type (i.e., a single radiation pattern). "Multi-mode fiber (MMF)" thus has been used to generally refer to a fiber that facilitates light propagation that is designated by two or more light characteristic types (i.e., two or more radiation patterns).

From a practical standpoint, MMF has generally offered lower capacity than SMF. Transmission rates in MMF are limited by the propagation of multiple transverse modes at different group velocities; this may typically be referred to as modal dispersion, e.g., wherein a signal is spread in time due to different propagation velocities for different modes. SMF is typically free of this type of modal dispersion. Hence, in recent decades, research on SMF systems has far outstripped work on MMF systems. SMF systems can transport terabits per second over thousands of kilometers. However, MMF systems have typically been limited to a bit rate-distance product well below 10 Gb/s-km.

In some aspects, wireless channel communications are analogous to MMF communications. Multipath fading in wireless systems was traditionally viewed as a strictly deleterious phenomenon. Various techniques have been devised to overcome fading in single-input, single-output (SISO) links, including diversity and equalization, as well as multicarrier and spread spectrum modulation. In recent years, it has been realized that multipath fading actually creates additional spatial dimensions that can be exploited by multi-input, multi-output (MIMO) techniques to dramatically enhance wireless transmission capacity. The plurality of modes in MMF has traditionally been viewed as a strictly negative, bandwidth-limiting effect, and various techniques have been proposed to counter modal dispersion.

Various approaches for eliminating modal dispersion in SISO MMF links have been proposed. For example, multimode fibers with substantially low modal dispersion have been developed. Wavelength-division multiplexing (WDM) can be used to increase the aggregate bit rate (but is relatively high in cost). Various other techniques, including controlled launch, electrical equalization or subcarrier modulation can provide relatively limited increase in bit rate-distance product associated with multimode fibers.

Among less conventional approaches, a segmented photodetector can be used to perform spatially resolved intensity detection. The photocurrents from the different segments can be processed using diversity combining and electrical equalization to mitigate the effect of modal dispersion. Another approach involves the use of diffractive optical elements to selectively excite one fiber mode in an attempt to reduce modal dispersion. With these approaches, fixed spatial filtering is used to launch into one "mode," which is more precisely described as an eigenmode of an idealized round, straight fiber. In real fibers, random fabrication errors and bends lead to coupling between these ideal eigenmodes over distances of centimeters to meters. Hence, even if one launches into a single ideal eigenmode, substantial modal dispersion still occurs over transmission distances of practical interest, which are tens to thousands of meters. Furthermore, in the presence of modal coupling, slow changes in the fiber temperature and stress make modal dispersion time-varying, on a time scale typically of the order of seconds. It is interesting to note that while modern graded-index fibers have far less modal dispersion than older step-index fibers, the velocity matching in graded-index fibers actually enhances mode coupling, making it even more difficult to control modal dispersion by launching into one ideal eigenmode.

Over the years, several groups have proposed various approaches to MIMO transmission in MMF. For instance, it has been suggested to exploit multiple spatial degrees of freedom using angle multiplexing, i.e., by launching different information streams at different angles. While this approach is tantalizing and has been proposed by several groups over the past two decades, it has failed because signals launched at different angels become cross-coupled after propagating a few meters in step-index or graded-index fibers.

SUMMARY

The present invention is directed to overcoming the above-mentioned challenges and others related to the types of devices and applications discussed above and in other applications. These and other aspects of the present invention are exemplified in a number of illustrated implementations and applications, some of which are shown in the figures and characterized in the claims section that follows.

Various aspects of the present invention are applicable to a class of adaptive spatial-domain signal processing approaches that mitigate the impact of modal dispersion in SISO links. Other aspects of the present invention are applicable to approaches that facilitate MIMO transmission, thus exploiting the multiple spatial dimensions in MMF and multimode waveguides. In some instances, the MIMO approaches simultaneously address modal dispersion issues and achieve multiplicative capacity gains using spatial multiplexing.

According to an example embodiment of the present invention, adaptive spatial domain signal processing, responsive to a feedback signal indicative of data conveyed in the multimode waveguide, is used to mitigate interference in optical signals conveyed in a multimode waveguide. In one implementation, intersymbol interference is mitigated. In another implementation, cross-channel interference is mitigated.

According to another example embodiment of the present invention, an optical transmission system is adapted for transmitting light via a multimode optic medium. The system includes the multimode optic medium, a transmitter to transmit light via the multimode optic medium, and a receiver to receive light transmitted via the multimode optic medium. The system also includes a light processor arrangement, which is included as part of at least one of the transmitter and the receiver and which is responsive to a feedback signal indicative of data conveyed in the multimode optic medium, to mitigate interference adaptively in optical signals conveyed in the multimode optic medium.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices and processes, and has been found to be particularly suited for the transmission of light via fiber optic media. While the present invention is not necessarily limited to such applications, various aspects of the invention may be appreciated through a discussion of examples using this context.

According to an example embodiment of the present invention, a multimode waveguide, such as a multimode fiber (MMF), approach is adapted for exhibiting principal modes that propagate independently with well-defined group delays in the presence (or absence) of modal coupling. Adaptive signal processing is implemented (e.g., with spatial light modulators (SLMs)) for the facilitation of the independently propagating principal modes. The transmission of light using these approaches is implemented using, e.g., intensity modulation with direct detection (IM/DD).

The MMF approach is adaptable for use with a variety of transmission and processing approaches. In one implementation, the MMF is implemented with single-input, single-output (SISO) processing, with transmitter-based spatial filtering used to excite a single principal mode. In another implementation, the MMF is implemented with multiple-input, multiple-output (MIMO) processing, using transmitter-based and receiver-based spatial filtering to transmit multiple information streams on different principal modes.

In another example embodiment of the present invention, a light transmission arrangement and approach involves spatially filtering light that is transmitted via a MMF medium. Light from a source such as a laser is intensity-modulated using one or more of a variety of approaches. The intensity-modulated light (signal) is spatially Fourier-transformed via a lens, spatially filtered with an SLM, spatially inverse-Fourier-transformed and coupled to the MMF medium. The light signal is then passed via the MMF medium to a light detector (e.g., a photodetector) where data is gleamed from the light.

In one implementation, on-off keying (OOK) is used for intensity modulation and typically involves characterizing data by the presence or absence of light. In this regard, light turned "ON" is used to characterize a first logic state (e.g., a "1" bit) and light turned "OFF" is used to characterize another logic state (e.g., a "0" bit).

In another implementation, multilevel pulse-amplitude modulation is used for intensity modulation in spatially filtering the light. Multilevel pulse-amplitude modulation involves, e.g., using the amplitude of individual, regularly spaced pulses in a pulse train is varied in accordance with some characteristic of the modulating signal. This variation is used to convey information.

In another embodiment, a feedback loop between the light detector and the light intensity-modulating function is used to reduce intersymbol interference (ISI), which is typical of an overlap between signals, or pulses, in optical communications. The ISI received in each symbol (optical information) is estimated, and estimates from each symbol are accumulated to yield a cost function representing the ISI (e.g., as described below, to yield a cost function that is the minimum noise-free eye opening ($d_{min}$)). The ISI cost function is fed back to the transmitter, where an adaptive algorithm computes updates to the SLM pixel settings so as to reduce ISI. In some instances, the feedback bit rate is typically negligible in comparison to the transmission rate.

As may be applicable in connection with certain example embodiments, the term "interference" may generally apply to deleterious light signals that are related to transmitted light signals. Examples of such interference include intersymbol interference and cross-channel interference caused by modal dispersion and modal coupling in multimode waveguides.

As used with various example embodiments and implementations herein, principal modes (PMs) are a generalization of the principal states of polarization (PSPs) for light propagation in optical fibers, and which are often referred to as polarization-mode dispersion (PMD). Considering the spatial dependence of linearly polarized (LP) modes in MMF, the polarization degree of freedom can be ignored for analysis purposes as used with various embodiments herein (i.e., PMD is generally weaker than modal dispersion in most MMFs).

As an example representation of PMs that may be used in connection with various example embodiments herein, one implementation involves a narrowband optical signal that is centered at frequency ω and propagates in a non-ideal fiber that supports N propagating modes. An electric field pattern $|e_a\rangle$ at the fiber input propagates to a field pattern $|e_b\rangle$ at the fiber output as represented by $$|e_b\rangle = T(\omega)|e_a\rangle. \quad (1)$$

$T(\omega)$ is an N×N matrix representing propagation (both loss and phase change) as well as modal coupling. Neglecting mode-dependent loss (a reasonable first-order approximation for lower-order modes), $T(\omega)$ is represented as $$T(\omega) = e^{\gamma(\omega)} U(\omega), \quad (2)$$

where $\gamma(\omega)$ is a scalar representing loss and phase change (averaged over the N modes) and $U(\omega)$ is an N×N unitary matrix representing lossless propagation and modal coupling.

In an N-mode fiber, there exists a set of input PMs $|a_n\rangle$, n=1, . . . ,N, and a set of corresponding output PMs $|b_n\rangle$, n=1, . . . , N. An input PM $|a_n\rangle$ is launched, with the corresponding output PM $|b_n\rangle$ appearing at the output generally without cross-coupling to any of the other PMs:

$$|b_n\rangle = T(\omega)|a_n\rangle. \quad (3)$$

By analogy with PSPs, the PMs are defined such that, given an input PM $|a_n\rangle$, the output PM $|b_n\rangle$ is independent of frequency ω to a first order. Thus, a pulse-modulated optical signal transmitted with modal shape $|a_n\rangle$ retains its integrity and is received in modal shape $|b_n\rangle$ and generally without modal dispersion to a first order in ω. The group delay operator can be defined as follows:

$$F(\omega) = -iU^+(\omega)\frac{\partial U}{\partial \omega}, \quad (4)$$

and can show that each input PM is an eigenmode of $F(\omega)$:

$$F(\omega)|a_n\rangle = \tau_n|a_n\rangle, \quad (5)$$

where the eigenvalue $\tau_n$ is simply the group delay of the PM. The N input PMs (or output PMs) are a complete, orthonormal set for describing propagating fields in the MMF. In the absence of modal coupling, the PMs are very nearly identical to the ideal fiber modes.

The above-described properties make the PMs suitable for SISO transmission with minimal modal dispersion, or for MIMO transmission with minimal cross-coupling and modal dispersion. Since the PMs depend on the matrix $U(\omega)$, which includes lossless propagation and modal coupling, the PMs will evolve slowly as stress, temperature and other fiber perturbations change. In the communication schemes described in connection with various example embodiments herein, it is not necessary to know what the PMs are at any point in time.

When PMs are known to exist, spatial signal processing techniques can be adapted as the PMs change in order to optimize data transmission as described further below.

Figure 1:
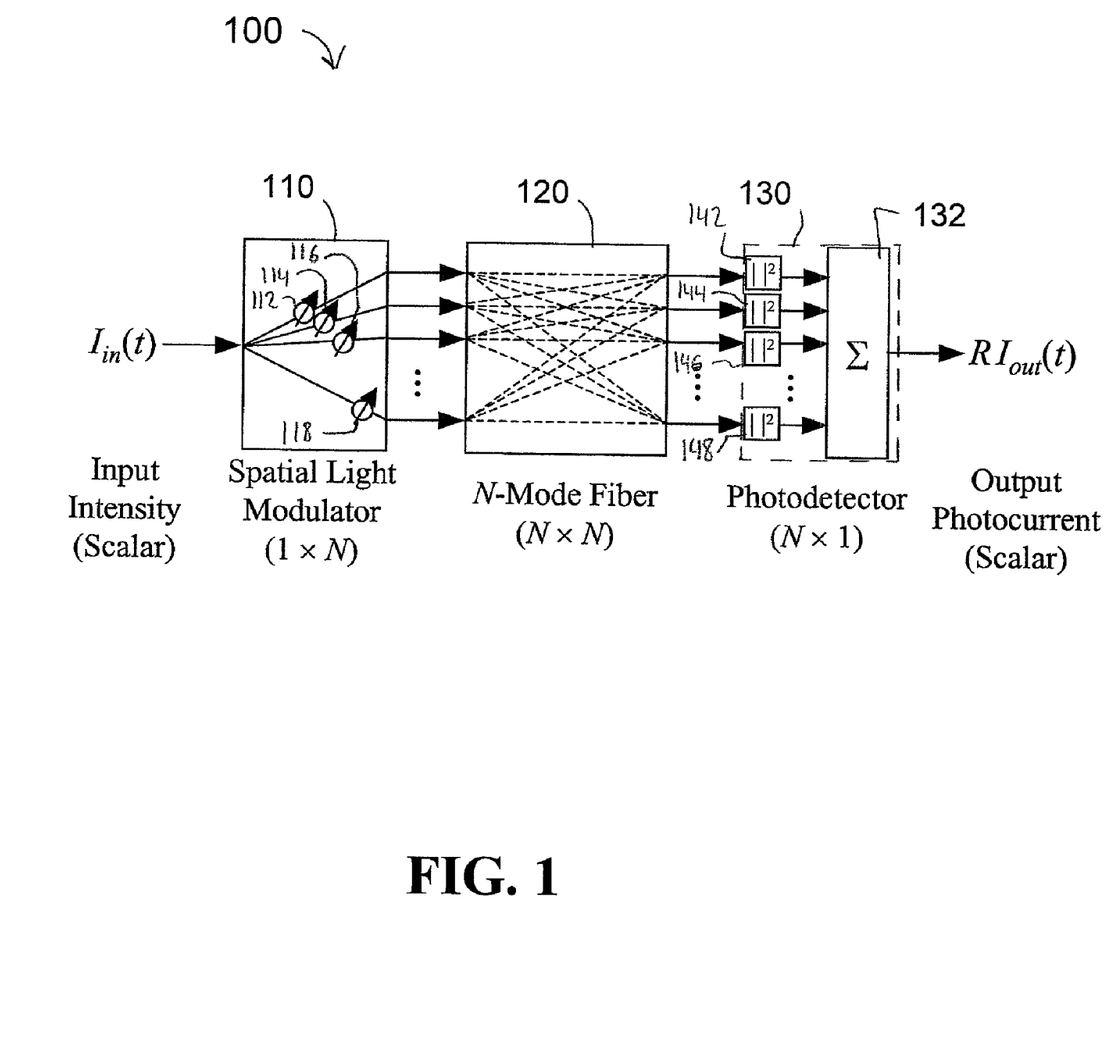
FIG. 1 shows a block diagram for a spatial-domain signal processing approach involving a single-input, single-output (SISO) communication system 100 using adaptive spatial filtering, according to another example embodiment of the present invention.

FIG. 1 shows a block diagram for a spatial-domain signal processing approach involving a single-input, single-output (SISO) communication system 100 using adaptive spatial filtering, according to another example embodiment of the present invention. The MMF supports a multiple number (N) of principal modes (PMs), and hence, can be described as an N×N MIMO system with inputs and outputs given by the $|a_n\rangle$ and the $|b_n\rangle$, respectively. A scalar input intensity signal $I_{in}(t)$ is mapped onto PMs including modes 112, 114, 116 and 118 (or more, depending on the total number of modes N), by a spatial light modulator (SLM) 110. The SLM 110 is a 1×N SIMO (single-input, multiple-output) system.

The PMs 112-118 are passed from the SLM 110 to an N-mode fiber 120 having N principal input modes (hereinafter "inputs") and N principal output modes (hereinafter "outputs"). The fiber 120 couples the output of the SLM 110 to a receiver photodetector 130 having N inputs and a single output. The PMs are generally orthogonal to the output plane of the fiber 120; thus, the total intensity is the sum of the squared intensities from each of the PMs (as represented by functions 142, 144, 146 and 148). The photodetector 130 (e.g., a square-law photodetector) detects the intensities in each of the N orthogonal PMs by squaring the field magnitude of each PM, as represented by shown squaring functions 142, 144, 146 and 148, to obtain the intensity. Each function physically coincides within the photodetector but is mathematically processed as shown. A summation block function 132 sums the detected intensities (integrating each intensity over the output plane of the fiber 120) to yield a scalar photocurrent output $RI_{out}(t)$. In this regard, the photodetector 130 is implemented here as an N×1 MISO (multiple-input, single-output) system.

Figure 2:
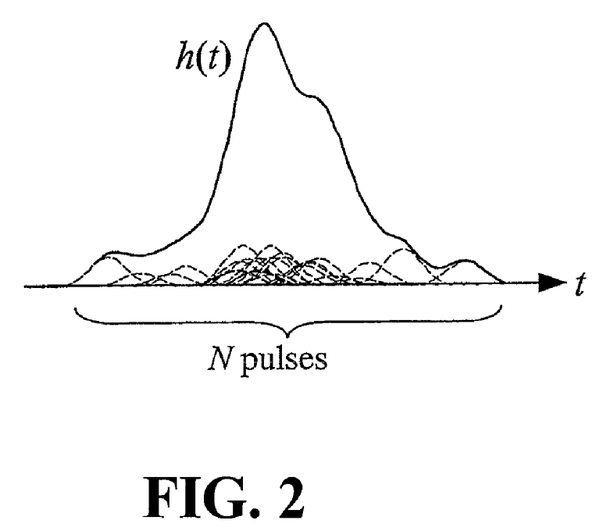
FIG. 2 shows an example impulse response for the output $RI_{out}(t)$ represented by the function "h(t)" as may be implemented in connection with one or more of the various embodiments herein, according to another example embodiment of the present invention.

FIG. 2 shows an example impulse response for the output $RI_{out}(t)$ represented by the function "h(t)." In this example, the SLM is not adapted for reducing ISI, such that h(t) includes contributions from each of the N PMs. In this regard, h(t) exhibits modal dispersion as shown. The plot of the function h(t) is thus asymmetrical (though not necessarily so), representing varied characteristics between the PMs and their respective contributions.

Figure 3:
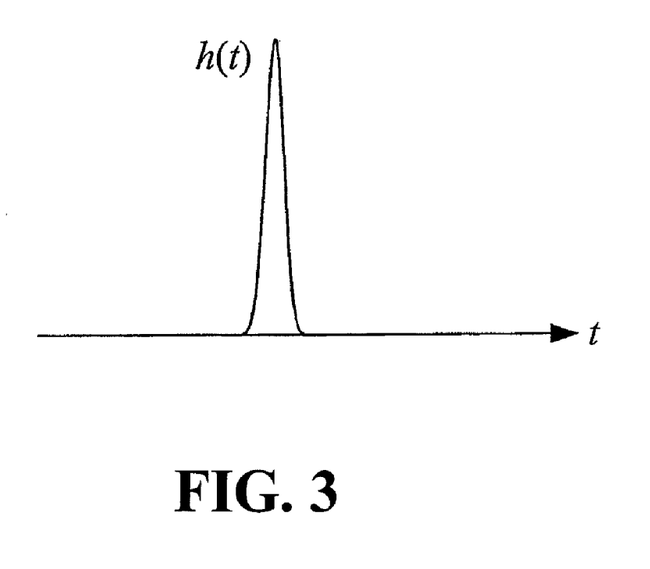
FIG. 3 shows an example response for the output $RI_{out}(t)$ represented by the function "h(t)" as may be implemented in connection with one or more of the various embodiments herein, according to another example embodiment of the present invention.

FIG. 3 shows an example response for the output $RI_{out}(t)$ represented by the function "h(t)." In this example, the SLM is adapted for reducing ISI (e.g., using a feedback loop from a receiver), where h(t) includes the contribution from only one PM (or from several PMs having nearly identical group delays). In this regard, the function h(t) does not exhibit the modal dispersion as shown in FIG. 2 and, thus, the resulting plot exhibits an impulse that is generally narrow (short) in time (i.e., the pulse width is less than one symbol interval). The description below in connection with FIG. 4 further discusses an adaptive approach for reducing ISI.

In one implementation, the SISO system impulse response h(t) shown in FIG. 2 and FIG. 3 is computed as follows. The principal mode $|a_n\rangle$ is let to correspond to a spatial electric field pattern $a_n(x,y)$ in the MMF input plane, and $A_n(k_x,k_y)$ is let to denote its spatial Fourier transform in the SLM plane. The complex reflectance of the SLM is denoted by $V(k_x,k_y)$. Considering only first-order modal dispersion, the impulse response is then given by:

$$h(t) = e^{-\alpha L} \sum_{n=1}^{N} \left| \int\int V^*(k_x, k_y) A_n(k_x, k_y) dk_x dk_y \right|^2 \delta(t - \tau_n). \quad (6)$$

The factor of $e^{-\alpha L}$ represents fiber loss. Each PM contributes, to the impulse response, an impulse delayed by the corresponding group delay and scaled by the absolute square of the inner product between the SLM reflectance and the spatial Fourier transform of the PM mode field pattern. When chromatic dispersion and higher-order modal dispersion are included, each impulse is broadened into a pulse of finite width. If the SLM is discretized into square pixels of size $\Delta k \times \Delta k$ at locations $(k_{x_i}, k_{y_j})$, the impulse response is approximated by:

$$h(t) \approx e^{-\alpha L} \Delta k^2 \sum_{n=1}^{N} \left| \sum_{i,j} V^*(i,j) A_n(i,j) \right|^2 \delta(t - \tau_n), \quad (7)$$

where (i,j) is shorthand for $(k_{x_i}, k_{y_j})$.

Equation (7) above shows the impulse response of a SISO link controlled by optimizing the SLM reflectance on a finite set of pixels {i,j}. In some instances, the pixel reflectance values are quantized to a small discrete set of phases (e.g., binary phase, $V(i,j) \in \{e^{i\pi}, e^{i0}\} = \{-1, 1\}$) or amplitudes (e.g., binary amplitude $V(i,j) \in \{0,1\}$). Various example approaches for the implementation of Equation (7) for SISO adaptive algorithms are described herein. In some instances, modal dispersion is controlled using about 400 binary phase-only pixels.

Figure 4:
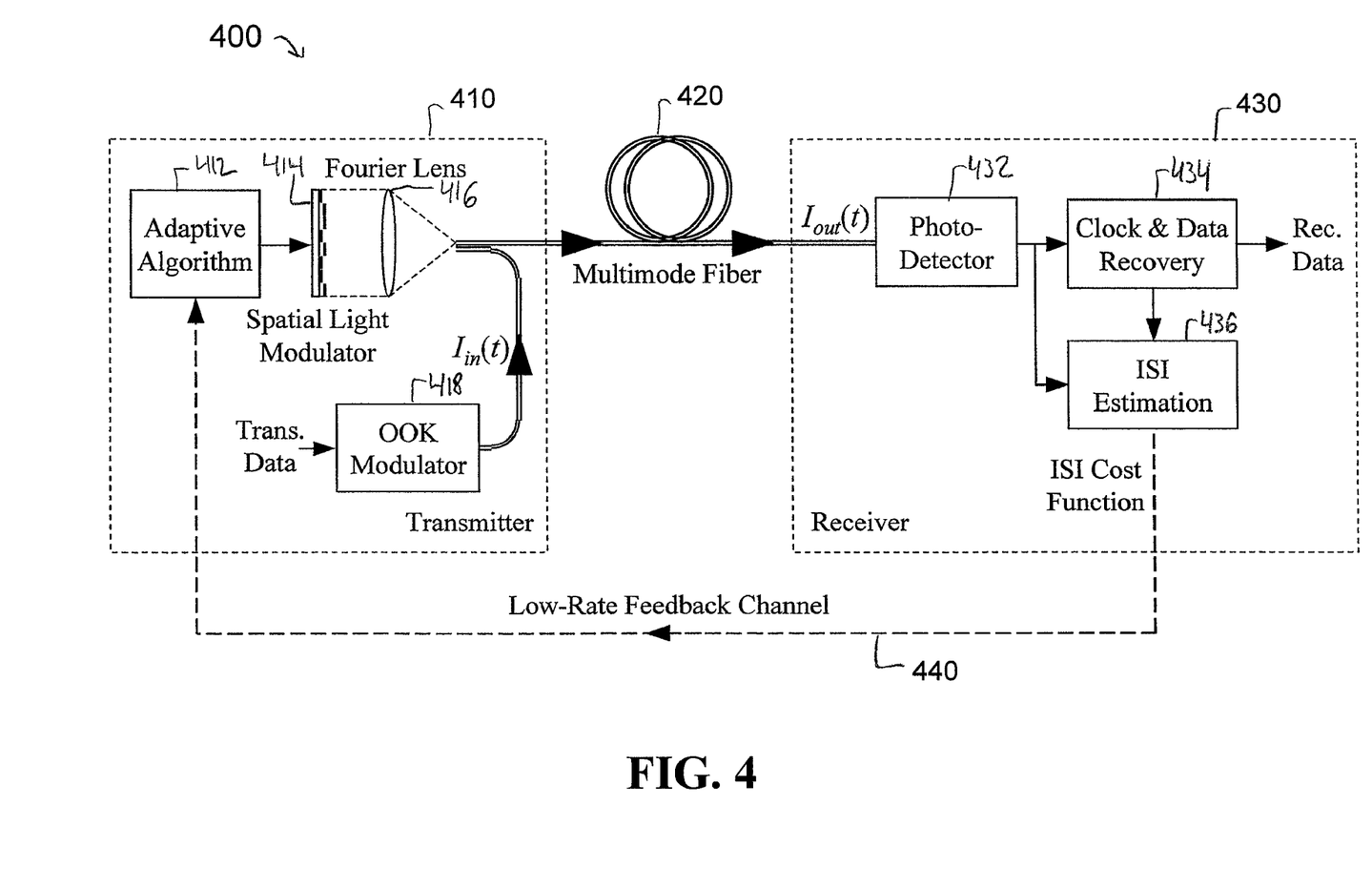
FIG. 4 shows a SISO communication system 400, according to another example embodiment of the present invention.

FIG. 4 shows a SISO communication system 400, according to another example embodiment of the present invention. The system 400 may be implemented using an approach that is similar, for example, to that implemented with the system discussed in connection with FIGS. 1-3. The system includes a transmitter 410 adapted to transmit optical information via a multimode (MMF) fiber 420 to a receiver 430. A low-rate feedback channel 440 provides feedback from the receiver 430 to the transmitter 410.

The transmitter 410 includes an adaptive algorithm function 412, a spatial light modulator (SLM) 414, a Fourier lens 416 and an on-off keying (OOK) modulator 418. Light from a laser is intensity modulated using the OOK modulator 418, with the output of the intensity-modulated laser light being represented by a modulated signal, $I_{in}(t)$. In some implementations, the OOK modulator 416 is replaced with a multilevel pulse-amplitude modulator that modulates the intensity of the laser light. The adaptive algorithm function 412 uses feedback from the receiver 430 to adjust the SLM 414 to reduce ISI. Using the adaptive algorithm function 412, the modulated signal $I_{in}(t)$ is spatially Fourier-transformed with the Fourier lens 416, spatially filtered with the SLM 414, spatially inverse Fourier-transformed, and coupled into the MMF 420.

The receiver 430 includes a photodetector 432, a clock and data recovery function 434 and an ISI estimation function 436. A signal $I_{out}(t)$ is output from the MMF 420 and photodetected at photodetector 432. The clock and data recovery function 434 processes the output of the photodetector for use by the ISI estimation circuit 436 and for generating a data output (for recording or otherwise processing data received via the MMF 420). The ISI received in each symbol is estimated at the ISI estimation function 436 and the estimates are accumulated to yield an ISI cost function representing (e.g., $d_{min}$, the minimum noise-free eye opening). The ISI cost function is output from the ISI estimation function 436 and fed back to the transmitter 410 via the low-rate feedback channel 440, where the adaptive algorithm function computes updates to pixel settings of the SLM 414.

Figures 5A, 5B:
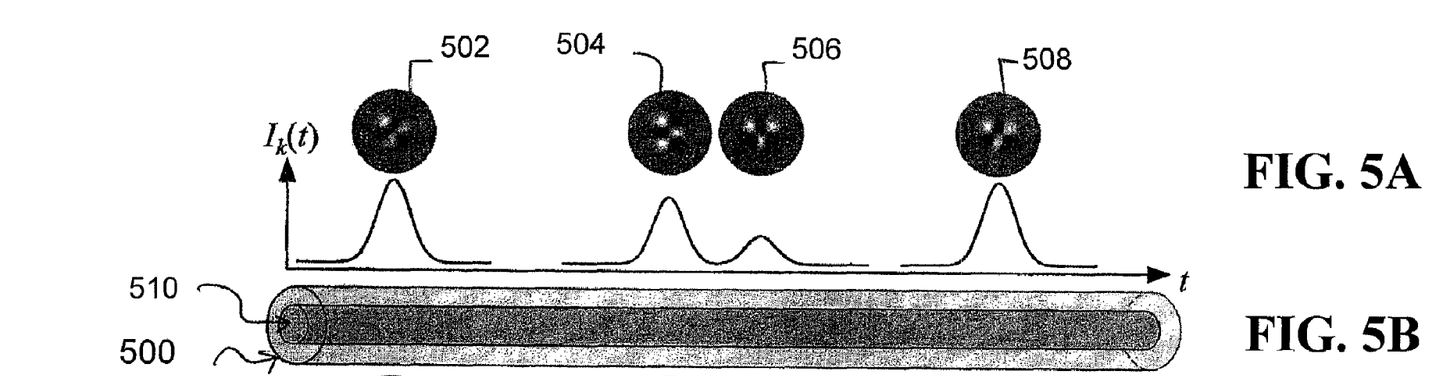
FIG. 5A shows principal modes in multimode fiber of FIG. 5B, according to another example embodiment of the present invention.
FIG. 5B shows a fiber having an outer cladding surrounding an inner core that transmits multimode optical signals, according to another example embodiment of the present invention.
Figure 5C:
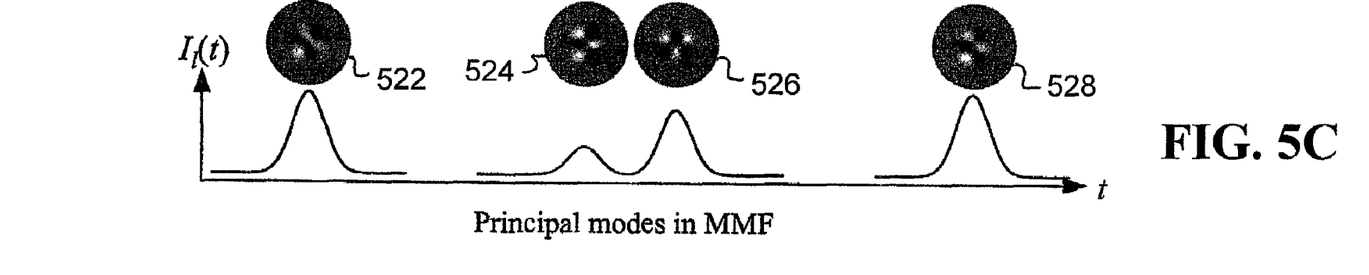
FIG. 5C shows principal modes in multimode fiber of FIG. 5B, according to another example embodiment of the present invention.

FIGS. 5A-5C show principal modes in multimode fiber, with the fiber shown in FIG. 5B and FIGS. 5A and 5C respectively showing two of N PMs in the fiber, according to another example embodiment of the present invention. The fiber in FIG. 5B has an outer cladding 500 surrounding an inner core 510 that transmits multimode optical signals (i.e., the fiber is an N mode MMF). The PMs shown in FIGS. 5A and 5C depict evolution of spatial field patterns and pulse intensities for the fiber in FIG. 5B. Each principal mode may be in one or two polarizations, and is a linear combination of up to N idealized fiber modes. For simplicity, this figure assumes that each principal mode is a combination of only two modes; however, multiple modes can be combined and implemented using similar approaches for other example embodiments.

FIG. 5A and FIG. 5C show two PMs, $I_k(t)$ and $I_l(t)$, which are a pair of mutually orthogonal spatial field patterns; accordingly, the corresponding output PMs represent orthogonal field patterns. A pulse launched into one of the input PMs splits apart into two pulses as it propagates, but arrives at the output as a single pulse in the corresponding output PM. In the general case where each PM includes a combination of up to N modes, a pulse launched in an input PM splits apart into as many as N pulses but arrives as a single pulse in the corresponding output PM.

Figure 6A:
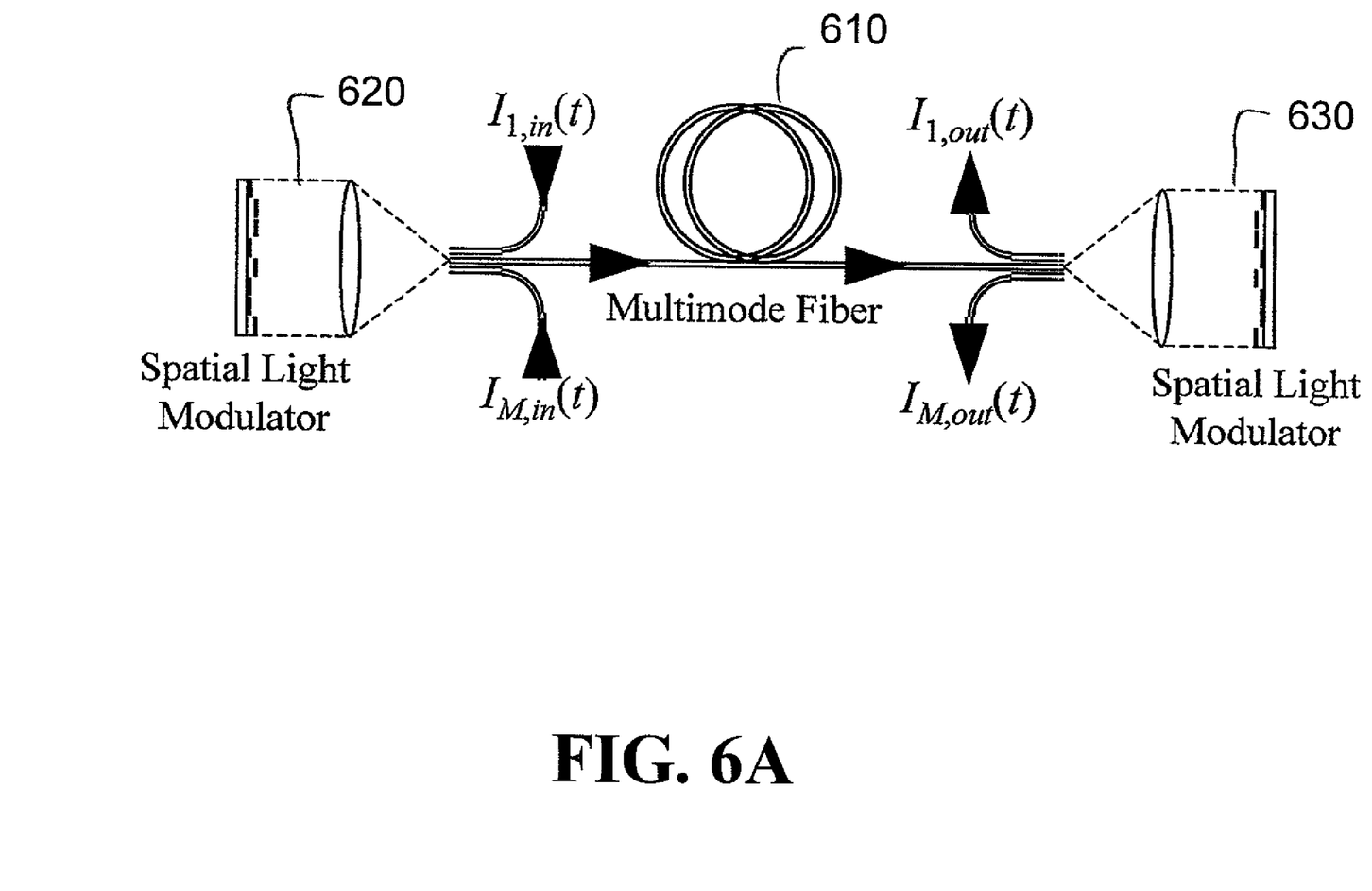
FIGS. 6A and 6B show alternatives for spatial multiplexing and demultiplexing in M×M multi-input, multi-output (MIMO) links, according to other example embodiments of the present invention.
Figure 6B:
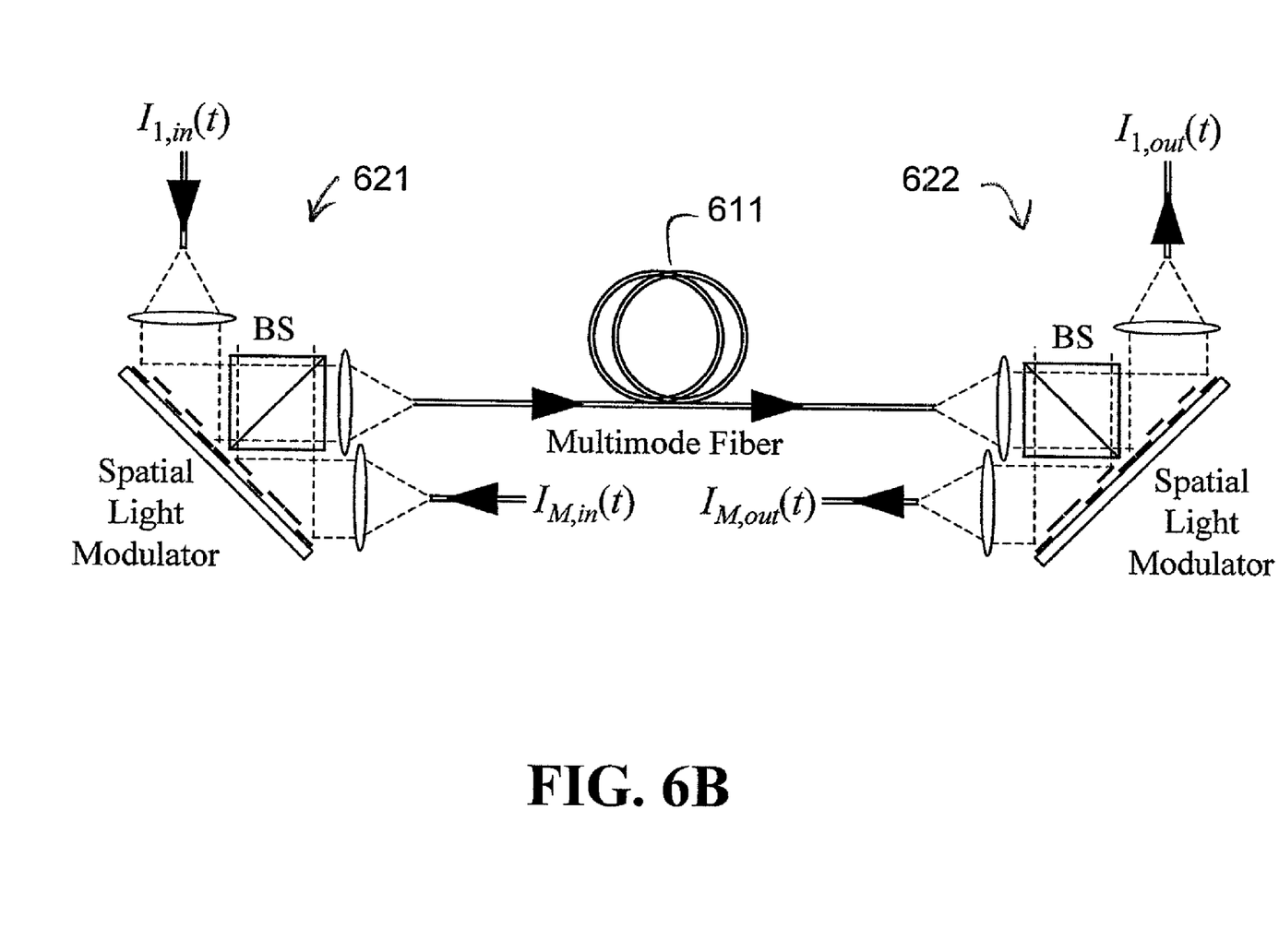

FIGS. 6A and 6B show alternatives for spatial multiplexing and demultiplexing in M×M multi-input, multi-output (MIMO) links, according to other example embodiments of the present invention. The case M=2 is illustrated for simplicity. FIG. 6A shows multiplexed operation of spatial light modulators and FIG. 6B shows the combining and splitting of signals using beamsplitters (BS). The beamsplitter loss is 1/M at each of the transmitter and receiver. In the case M=2, the transmitter (but not receiver in general) may use a polarizing beamsplitter, which is lossless in principle. In an M×M MIMO system (e.g., as shown in FIGS. 6A and 6B), the transmitter spatially multiplexes M independent information streams by launching them into different input PMs. The receiver spatially demultiplexes these M streams by coupling them from the corresponding output PMs onto separate photodetectors.

In FIG. 6A, a single lens and SLM combination (620, 630) is used at each end of a link including MMF 610. The transmitter SLM 620 can be described as a multiplex of M different holograms, each of which maps one of the input signals to a different input principal mode. The receiver SLM 630 can be described similarly as the multiplex of M different holograms. Each SLM may be implemented to incur, for example, a power loss of up to 1/M due to multiplexing and may incur crosstalk. The multiplexing loss and crosstalk level may depend on a number of factors, including M (the number of inputs and outputs), N (the number of PMs), the number of SLM pixels, the number of quantization levels of the SLM reflectance, and differences in the spatial field patterns of the various PMs chosen for spatial multiplexing.

In an alternate spatial multiplexing configuration, M separate SLMs are used to encode the transmitted signals into different PMs, and the M beams are combined using M−1 beamsplitters. Likewise, the receiver uses M−1 beamsplitters and M separate SLMs to perform spatial demultiplexing. As shown in FIG. 6B, for small M, it is feasible to simply use M non-overlapping regions of a single SLM at each end of the link 611, with SLM arrangements (with beamsplitters) 621 and 622 at input and output positions respectively. For example, a commercially available 256×256 pixel SLM can multiplex or demultiplex several signals, assuming each signal requires several hundred to several thousand SLM pixels. Using ordinary beamsplitters, multiplexing and demultiplexing losses of 1/M are incurred. In some implementations, the multiplexing loss can be reduced by a factor of two by using a polarizing beamsplitter.

Figure 7A:
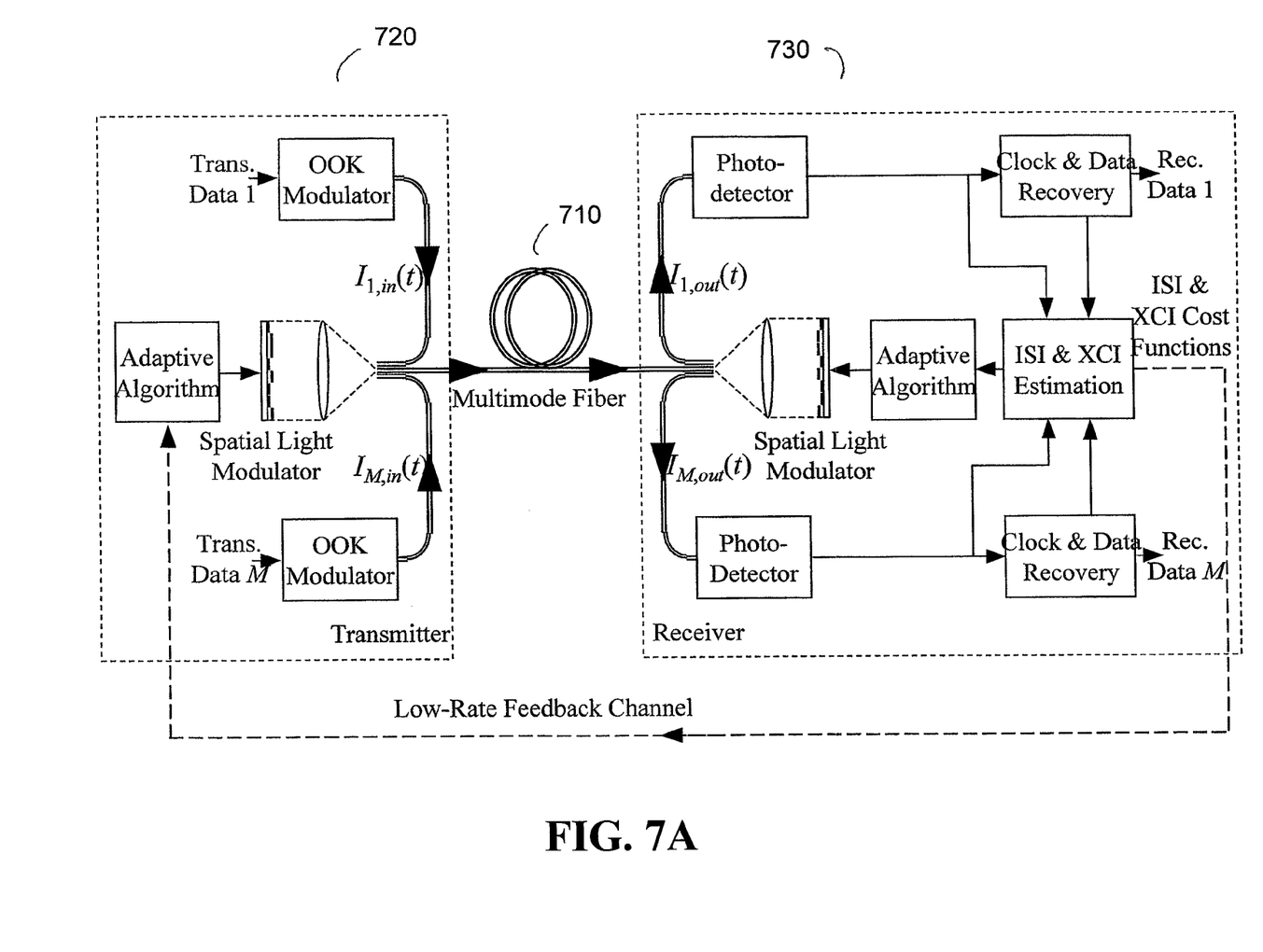
FIGS. 7A and 7B show an M×M MIMO communication approach using adaptive spatial filtering, according to another example embodiment of the present invention.
Figure 7B:
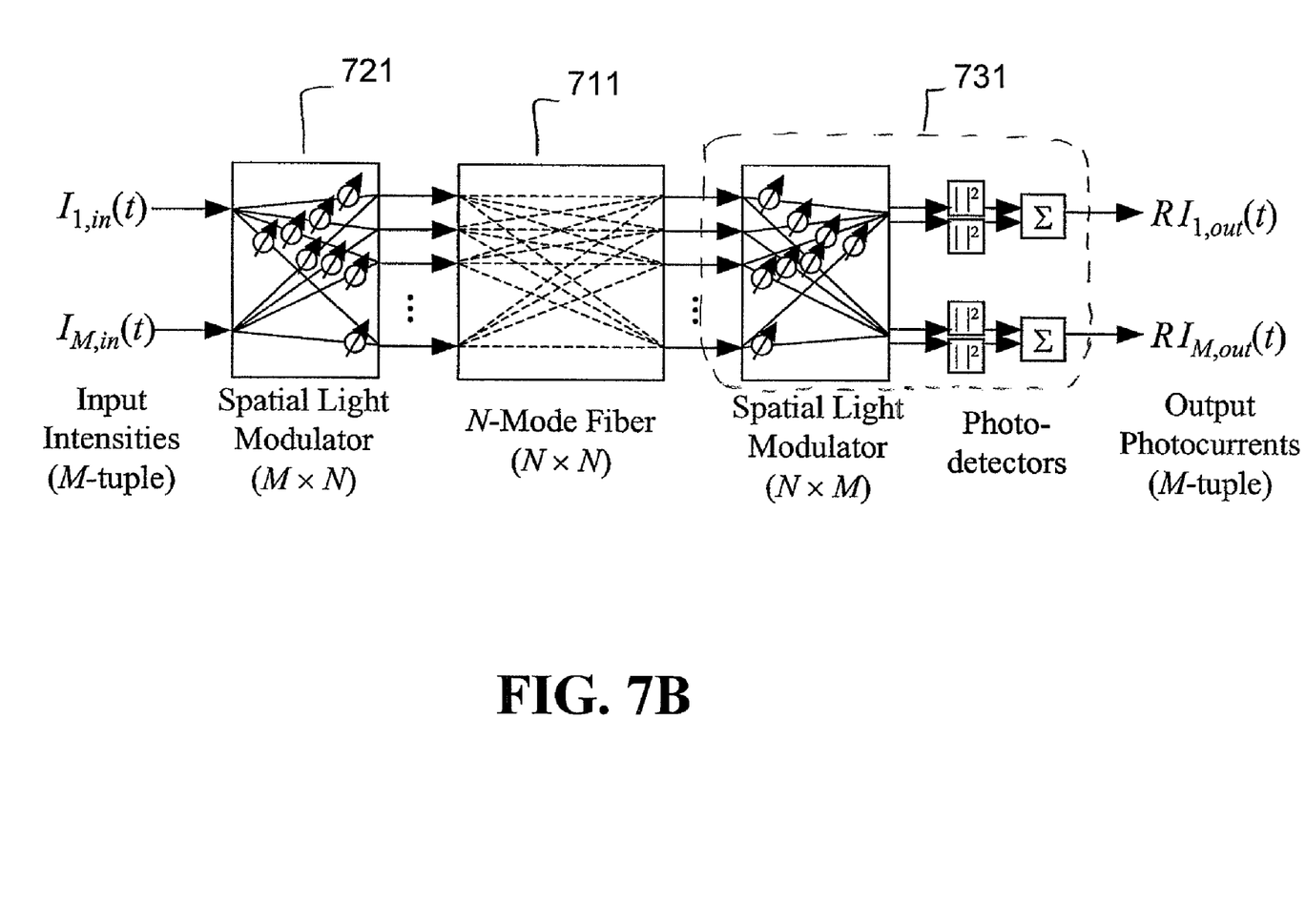

FIGS. 7A and 7B show an M×M MIMO communication approach using adaptive spatial filtering, according to another example embodiment of the present invention. The case M=2 is illustrated for simplicity. FIG. 7A shows a physical configuration of the communications approach with an M×M MIMO transmission link, based on multiplexed operation of spatial light modulators at transmitter and receiver arrangements 720 and 730 respectively at the transmitter and receiver ends of a MMF 710. M independent intensity-modulated data signals are transmitted and received by direct-detection receivers. From the received signals, ISI and cross-channel interference (XCI) are estimated, and estimates are accumulated to yield cost functions representing ISI and XCI. Algorithms run at both the transmitter and the receiver arrangements 720 and 730 update the SLM pixels in order to optimize the cost functions. The transmitter and receiver arrangements 720 and 730 may be implemented, for example, in a manner similar to that discussed with FIG. 4 and implemented for similar components (with an SLM at the receiver end).

When used for MIMO systems, at the transmitter end of a light transmission arrangement (e.g., transmitter arrangement 720 of FIG. 7A), the polarization sensitivity of SLMs are accommodated without necessarily modifying the spatial multiplexing schemes. At the receiver end (e.g., receiver arrangement 730 of FIG. 7A), a polarization-diversity spatial demultiplexer with a polarizing beamsplitter and a pair of SLMs is used. Each spatially demultiplexed light channel is detected by a pair of receivers in two orthogonal polarizations, and the corresponding outputs are combined.

FIG. 7B shows a block diagram depicting spatial-domain signal processing, functionally representing an approach similar to that shown in FIG. 7A. The transmitter arrangement 720 corresponds to transmitter arrangement 721, the MMF 710 corresponds to MMF 711 and the receiver arrangement 730 corresponds to receiver arrangement 731. As explained above, the MMF 711 can be described as an N×N MIMO system with inputs and outputs given by the $|a_n\rangle$ and the $|b_n\rangle$, respectively. At the transmitter arrangement 721, the vector of M input signals $\{I_{1,in}(t), \ldots, I_{M,in}(t)\}$ is mapped onto the principal modes by the SLM, which is an M×N MIMO system. Similarly, the SLM at the receiver arrangement 731 can be viewed as an N×M MIMO system.

Various types of adaptive algorithms can be used to aid in the adjustment of an SLM in order to reduce ISI in SISO links, or in the adjustment of one or more SLMs to reduce ISI and XCI in MIMO links. In various implementations, a low-complexity single-coordinate ascent (SCA) scheme is used for light processing involving the generation of feedback for use in reducing ISI (e.g., as can be implemented with FIG. 4). In some implementations, the SCA scheme is used for also reducing XCI as can be implemented, e.g., with FIG. 7A. In the reduction of ISI, a single SLM pixel is changed, and the ISI is measured for a number of bits in order to form an accurate estimate of the cost function $d_{min}$. The cost function estimate is fed back to the transmitter, where it is decided whether or not to keep the last pixel change made. The SCA technique can adapt from an arbitrary starting point without prior knowledge of the MMF. This SCA scheme works as well as much more complicated algorithms based on semidefinite programming. For more information regarding light processing in general, and for specific information regarding light processing approaches involving the cost function $d_{min}$ and/or SCA schemes, reference may be made to U.S. Pat. No. 7,194,155, entitled "Adaptive Control for Mitigating Interference in a Multimode Transmission Medium", which is fully incorporated herein by reference.

In another implementation, a 10 Gb/s SISO link transmitting over a 1 km long, 64 μm step-index fiber, which supports 88 modes (per polarization) at 850 nm wavelength is implemented with light transmission. A binary phase-only SLM ($V(i,j) \in \{e^{i\pi}, e^{i0}\} = \{-1, 1\}$) is used.

Figure 8:
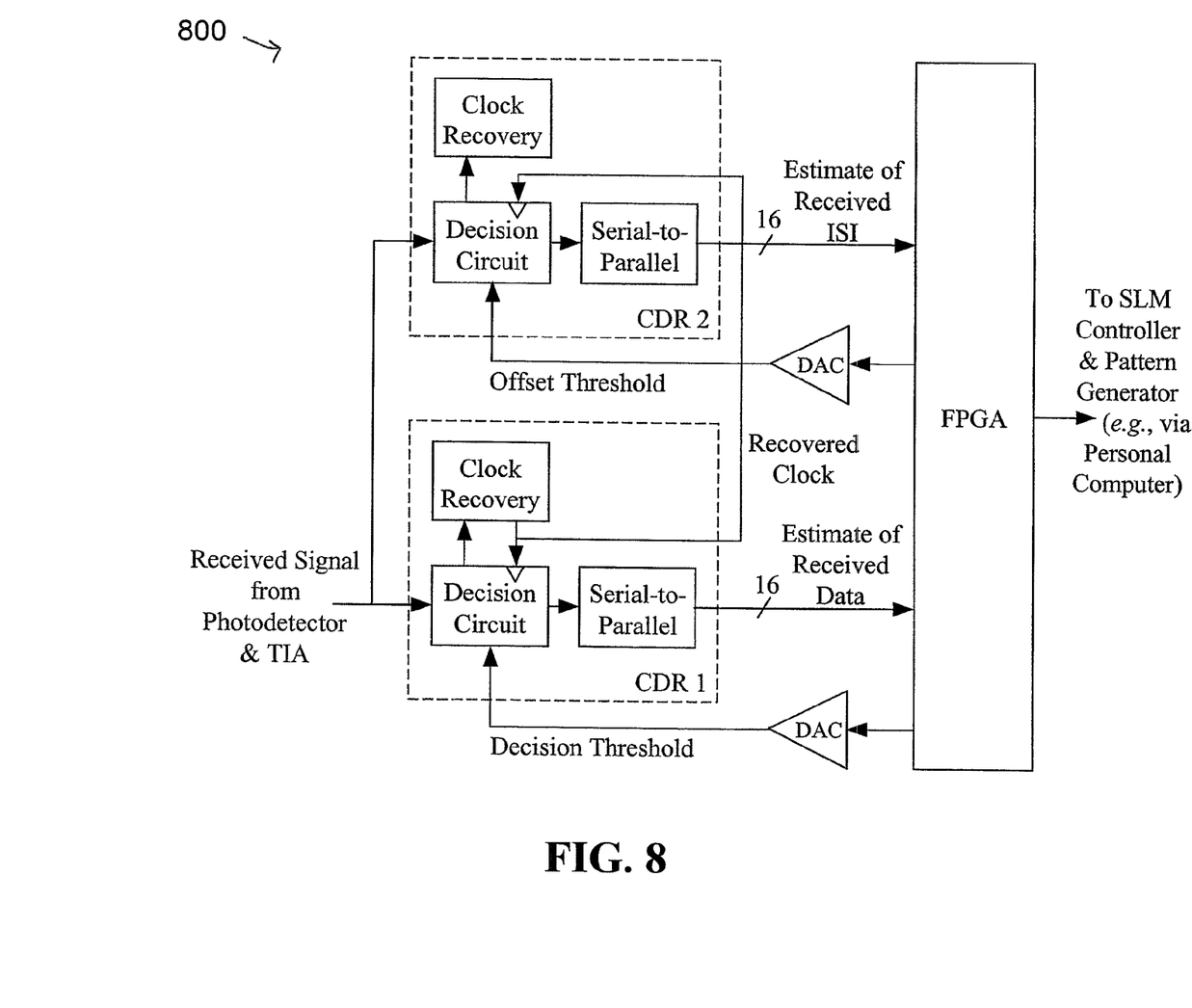
FIG. 8 shows an adaptation algorithm system 800 for an M×M MIMO system, according to another example embodiment of the present invention.

FIG. 8 shows an adaptation algorithm system 800 for SISO transmission, according to another example embodiment of the present invention. Multiple copies of the system 800 can be implemented for MIMO systems. The system 800 is implemented, for example, with light transmission as shown in one or more example embodiments herein (e.g., with block 412 of FIG. 4 and/or with the transmitter/receiver arrangements 720 and 730 of FIG. 7A). Abbreviations shown in and used with FIG. 8 and their corresponding meanings include the following:

TIA: transimpedance amplifier,
CDR: clock and data recovery,
DAC: digital/analog converter,
ISI: intersymbol interference,
FPGA: field-programmable gate array, and
SLM: spatial light modulator.

While the present invention has been described with reference to several particular example embodiments, those skilled in the art will recognize that many changes may be made thereto without departing from the spirit and scope of the present invention.

What is claimed is:

1. A system for transmitting light, the system comprising:
   a transmitter including an adaptive algorithm function, a spatial light modulator (SLM), a Fourier lens, and an on-off keying (OOK) modulator;
   a multimode fiber (MMF);
   wherein the output modulating signal is spatially Fourier-transformed with Fourier lens, spatially filtered with said SLM, spatially inverse Fourier-transformed, and coupled into said MMF;
   a receiver including a photodetector, a clock and data recovering function, and an intersymbol interference (ISI) estimation circuit;
   wherein said clock and data recovery function processes the output of said photodetector, and said ISI estimation circuit processes the output of said clock and data recovering function;
   wherein ISI cost function is output from said ISI estimation circuit and fed back to said transmitter via a low-rate feedback channel, wherein said adaptive algorithm function computes updates to pixel settings of said SLM.

2. A method for transmitting light, the method comprising:
   transmitting light signal passing through a transmitter including an adaptive algorithm function, a spatial light modulator (SLM), a Fourier lens, and an on-off keying (OOK) modulator;
   spatially Fourier-transforming the output modulating signal with said Fourier lens,
   spatially filtering said output modulating signal with said SLM, spatially inversing Fourier-transforming said output modulating signal, and coupling said output modulating signal into said MMF;

receiving said output modulating signal into a photodetector, a clock and data recovering function and an ISI estimation circuit;

wherein said clock and data recovery function processes the output of said photodetector, and said ISI estimation circuit processes the output of said clock and data recovering function; wherein ISI cost function is output from said ISI estimation circuit and fed back to said transmitter via a low-rate feedback channel, wherein said adaptive algorithm function computes updates to pixel settings of said SLM.

* * * * *